United States Patent [19]

Brewer et al.

[11] Patent Number: 5,431,299

[45] Date of Patent: Jul. 11, 1995

[54] MEDICATION DISPENSING AND STORING SYSTEM WITH DISPENSING MODULES

[75] Inventors: Andrew E. Brewer, 395 E. Sycamore St., Columbus, Ohio 43206; Gary P. Maul, Worthington; Mark A. Battisti, Columbus, both of Ohio

[73] Assignee: Andrew E. Brewer, Columbus, Ohio

[21] Appl. No.: 187,175

[22] Filed: Jan. 26, 1994

[51] Int. Cl.$^6$ ............................................. G07F 11/52
[52] U.S. Cl. ........................................ 221/2; 221/7; 221/12; 221/76; 221/155; 221/130; 221/131; 221/253; 221/256
[58] Field of Search ............ 221/253, 155, 76, 77, 221/2, 6, 7, 12, 97, 130, 131, 256, 263

[56] References Cited

U.S. PATENT DOCUMENTS

| | | | |
|---|---|---|---|
| 628,656 | 7/1899 | Fisher | 221/253 X |
| 1,578,986 | 3/1926 | Graves | 221/253 X |
| 2,272,750 | 2/1942 | Miller | 221/155 X |
| 3,253,736 | 5/1966 | Moyer et al. | 221/6 X |
| 3,606,959 | 9/1971 | Stonor | 221/256 X |
| 3,722,743 | 3/1973 | Atchley | 221/77 |
| 3,917,045 | 11/1975 | Williams et al. | 194/4 |
| 3,985,264 | 10/1976 | Shaw et al. | 221/17 |
| 4,274,551 | 6/1981 | Hicks | 221/155 X |
| 4,695,954 | 9/1987 | Rose et al. | 364/413 |
| 4,722,058 | 1/1988 | Nakayama et al. | 221/12 X |
| 4,785,969 | 11/1988 | McLaughlin | 221/2 |
| 4,847,764 | 7/1989 | Halvorson | 364/413.02 |
| 4,869,392 | 9/1989 | Moulding, Jr. et al. | 221/1 |
| 4,953,745 | 9/1990 | Rowlett, Jr. | |
| 5,014,875 | 5/1991 | McLaughlin et al. | 221/2 |
| 5,092,982 | 3/1992 | Kedem et al. | 221/3 |
| 5,141,128 | 8/1992 | Pippin | 221/253 X |
| 5,152,422 | 10/1992 | Springer | 221/2 |
| 5,190,185 | 3/1993 | Blechl | 221/1 |
| 5,197,632 | 3/1993 | Kaufman et al. | 221/197 |
| 5,314,243 | 5/1994 | McDonald et al. | 221/2 X |
| 5,321,625 | 6/1994 | Humm et al. | 221/7 X |

FOREIGN PATENT DOCUMENTS 4164707 6/1992 Japan .................................. 221/2 X

OTHER PUBLICATIONS

Baxter Healthcare Corporation, "The Way to Keep Your Medications on Course . . . ", 1991.
Lionville Systems, Inc., "Access: The Next Level of Automated Drug Control", Jul. 1993.
Meditrol, "The Next Step in Pharmacy Automation", Undated.
Pyxis Corporation, "Advanced Point-of-Use Medication and Supply Systems for Cost-Effective Healtcare", 1992.
MedSelect Systems, "SelecTrac-Rx: The Integrated System that Extends Managed Control of Medications Throughout Your Hospital Facility", Undated.

*Primary Examiner*—James R. Bidwell
*Assistant Examiner*—Dean A. Reichard
*Attorney, Agent, or Firm*—Porter, Wright, Morris & Arthur

[57] ABSTRACT

A system for the controlled dispensing and storing of medication and more particularly, a programmable system with medication dispensing modules having a dedicated programmable processor to dispense medication, according to patient requirements that are programmed into the system. The modules incrementally dispense unit doses of medication in a highly controlled manner for a particular patient. The programmable processor of each module is independently capable of receiving and storing information about the respective type, quantity and medication information of each of the unit doses of medication loaded onto an assigned shelf of the module. The information in the programmable processor is automatically updated when a unit dose of medication is dispensed from the module so that the programmable processor contains information about the remaining inventory in the module at any given time.

22 Claims, 3 Drawing Sheets

MEDICATION DISPENSING AND STORING SYSTEM WITH DISPENSING MODULES

BACKGROUND AND SUMMARY OF THE INVENTION

The present invention relates generally to a system for the controlled dispensing and storing of medication and more particularly, to a computerized system with medication dispensing modules to dispense medication, according to patient requirements that are programmed into the system, in a manner that is efficient and accurate.

In a hospital, many patients require many different types of medications at different times throughout the day. There also may be different levels of communication as to who is to give the medication to the patients, as well as if, and when, the patient received the different medications. There is room for human error in dispensing the proper amount of medication at the proper times. There is also room for human error as to the proper billing of a patient for the types and amounts of medication that a patient receives. With a large number of patients and often a short amount of time for each patient, the chance for human error is greater with respect to the proper dosage as well as to the proper billing.

There exists a need for a system that dispenses unit doses of medication of the proper type and amount in an efficient and accurate way. Furthermore, there is a need for a system that keeps accurate records of the patient's medication and billing record. The present invention fulfills these needs and provides further advantages.

In accordance with the present invention, a computerized medication dispensing and storing system having a plurality of medication dispensing modules is provided. The medication dispensing and storing system comprises a cabinet having a plurality of drawers and compartments, wherein at least one of the compartments is adapted to hold a plurality of medication dispensing modules. The medication dispensing modules can easily be disconnected from the system and filled with medication by a pharmacist in a separate location than the system. A medication dispensing module comprises a rectangular shaped housing having a top, bottom, front, back and two sides, with the top having an opening to allow medication containers to be inserted therein by a pharmacist. The bottom of the rectangular shaped housing has an opening to allow medication containers to be dispensed therefrom into a dispensing drawer. The medication dispensing module also has a first shaft with each end rotatably secured to the sides of the housing near the top of the housing, such that the first shaft can be easily rotated along its axis. The dispensing module also has a second shaft with each end rotatably secured to the sides of the housing near the bottom of the housing, such that the second shaft can be easily rotated along its axis. The dispensing module includes a conveyor-type continuous loop of a plurality of shelves passing over the first and second shafts and a motor, operably connected to the second shaft, to rotate the second shaft along its axis, thereby causing the plurality of shelves to pass over the first and second shafts.

The system also includes a medication dispensing module connected to the motor to start and stop the plurality of shelves to properly dispense the medication into a dispensing drawer. Each drawer in the cabinet has a latch mechanism operably connected to a second programmable processor which opens the respective drawers to allow the user to retrieve the appropriate medication after the medication has been dispensed.

The medication dispensing module may further include sensors to detect when a medication container is inserted into the module, sensors to detect when a medication container is dispensed by the module, and sensors to detect when a shelf of the module has a medication container thereon. The sensors are connected to the first programmable processor 60 to record the information detected by the sensors, including the number and types of medication containers loaded in the modules and the number and types of medication containers dispensed by the module.

The dispensing modules are capable of dispensing a plurality of unit drug doses in medication containers of heterogeneous sizes, shapes and types. The medication containers that can be dispensed by the present invention include syringes, ampules, vials, by pills and capsules. The second programmable processor in the system preferably has touch screen capability to enable the user to easily interact with the system. The second programmable processor is capable of receiving and transmitting user information, patient information, medication information, etc. The first programmable processor 60 can be used to transfer information to and from a central processing unit of the second programmable processor and can automatically determine the inventory in the system at any given time. The system also has a printer to enable the user to print out hard copies of all transactions and records regarding the dispensation of medication.

The system may also have other features such as a magnetic card reader to allow authorized users only to use the system and an alarm when unauthorized users attempt to gain access to the system. The system will also give the user a message if a drug has been prescribed to a patient and the patient is allergic to that drug or, if two or more medications are prescribed to be given to the patient together, and the patient has a history of allergic reactions to a combination of these medications. The patient's history is pre-programmed into the system before any medication is dispensed to the patient.

The system may be portable/movable with wheels or rollers connected to the bottom of the cabinet. This enables the user to keep the medication near the patients.

Other objectives, advantages and novel features of the present invention will become apparent from the following detailed description of the invention and the accompanying drawings.

DETAILED DESCRIPTION OF PREFERRED EMBODIMENT(S)

Figure 1:
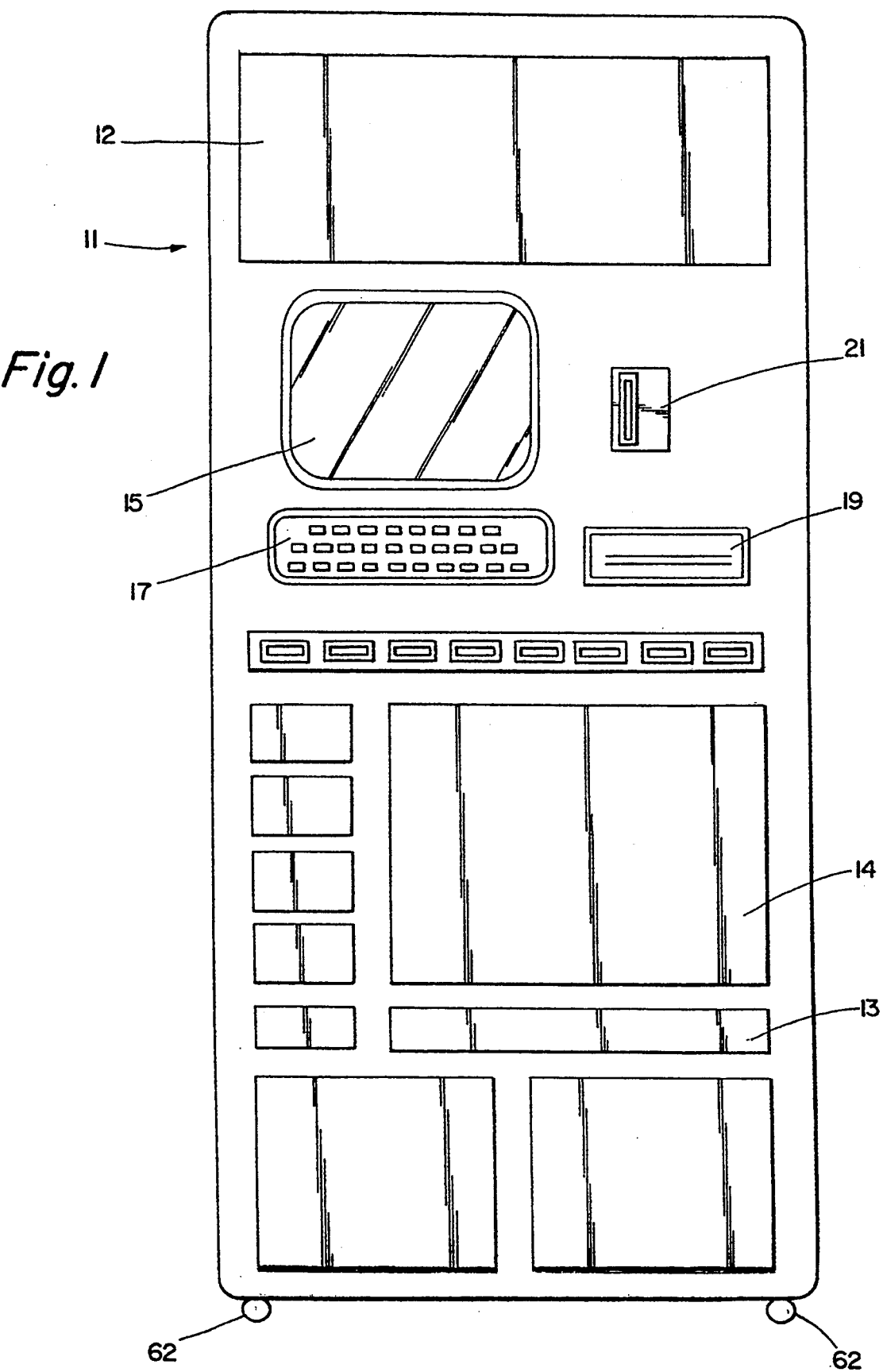
FIG. 1 is a front view of the medication dispensing and storing system.

Referring to FIG. 1, there is shown a front view of the medication dispensing and storing system 11 in accordance with the present invention. The system includes a cabinet 12 with a plurality of drawers and compartments. There is a compartment for a programmable processor monitor 15, a keyboard 17, and a printer 19 attached to the second programmable processor. The second programmable processor hardware may consist of hardware known in the art that has the capability of handling the amount of information that the system 11 requires. A 486 computer system with a 40 MHz hard drive is sufficient. A preferred embodiment may have a touch screen monitor 15 with icons for easy communication with a user of the system 11.

Figure 2:
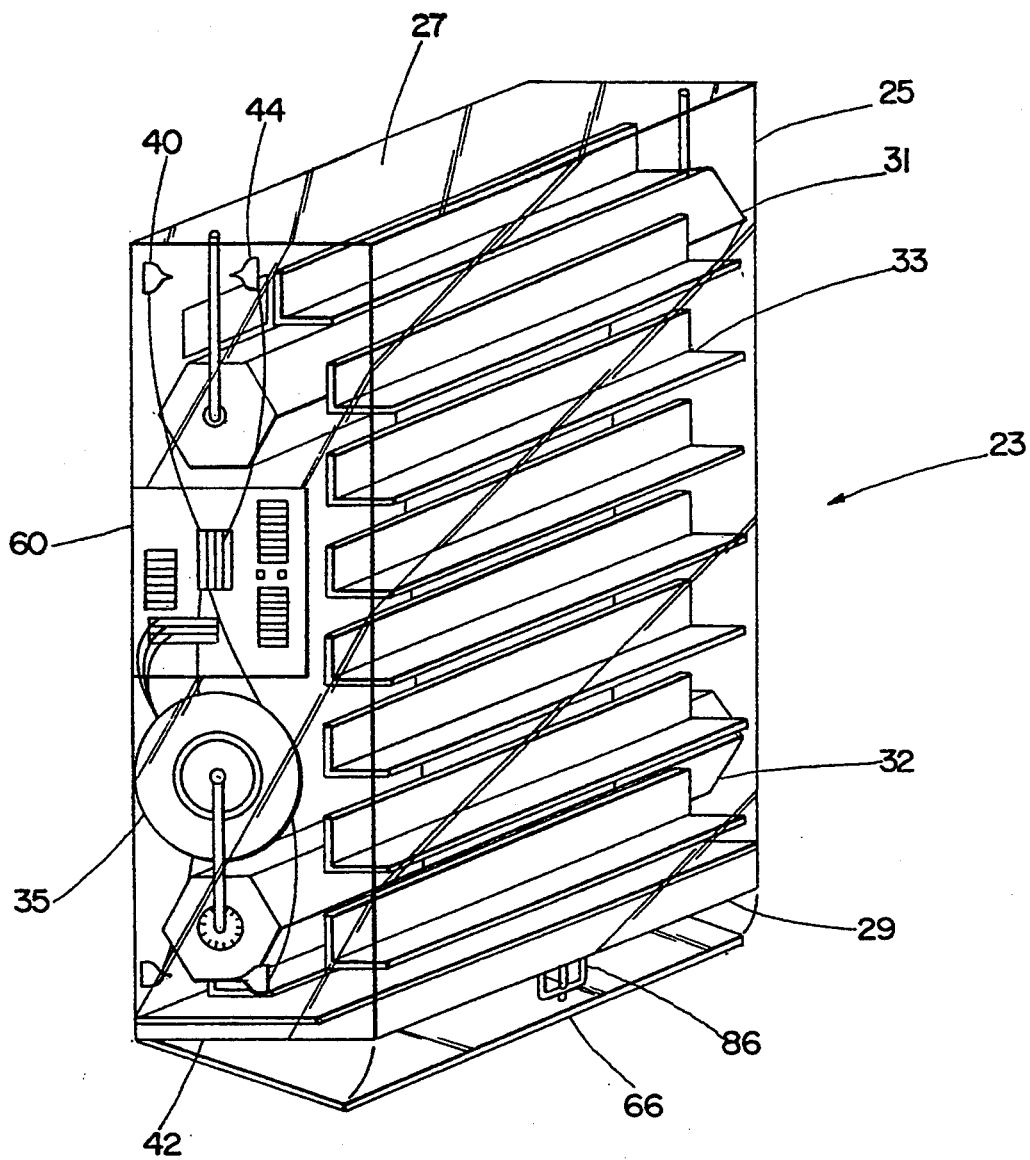
FIG. 2 is a perspective view of a medication dispensing module used in the present invention.

The system 11 may also have a magnetic card reader 21 that allows access to authorized users only to protect the security of the drugs stored and dispensed by the system 11. In many hospitals, the pharmacist, doctors and nurses have magnetic keycards with a personal identification number (PIN). Thus it is preferred that the system 11 accept the same magnetic keycards that these employees at the hospital already use. The system 11 has a compartment 14 into which a pharmacist may load and store medication dispensing modules 23 as shown in FIG. 2. Compartment 14 may have trays that slide out on which the medication dispensing modules 23 can be loaded. Compartment 14 is preferably designed to hold a number of different types and sizes of the dispensing modules 23 which dispense differing sizes, types and shapes of medication containers. These medication containers may include syringes, ampules, vials, pill, capsules, and other types of medical containers used in a hospital. A preferred embodiment of the present invention dispenses syringes, ampules and vials of medication. When the medication containers are dispensed by the dispensing modules 23, they fall, by gravity, into at least one medication dispensing drawer 13. When the appropriate medication has been dispensed by the system 11, the appropriate drawers automatically open to allow the user to retrieve the medication for a patient. Normally, class II products (the most strictly controlled substances) are dispensed in unit doses by the dispensing modules 23. Other classes of medication can also be dispensed by the dispensing modules 23, as well as being dispensed by one or more of the other drawers in the cabinet 12 which will automatically open when the proper information has been entered into the second programmable processor for a patient. The system 11 performs unit dose dispensing of the medications, which helps eliminate some of the potential for human error. The cabinet 12 contains a number of compartments that can be used as storage areas for such things as IV bags, bandages, etc. The cabinet will also contain at least one drawer for returning unused medication that has been dispensed by the system.

The second programmable processor of the system 11 is pre-programmed with many types of information, including user names, user passwords, patient names, patient room numbers, medication prescribed, medications to which the patient is allergic, patient's billing code, etc. All this information is used to accurately dispense medication to a large number of patients in a hospital setting. Under normal operation, a user will enter his or her user identification, either by inserting a magnetic card into the magnetic card reader 21 or by typing the user's name into the second programmable processor with the keyboard 17. The second programmable processor will then ask for the user's password to be entered into the system 11 via the keyboard 17.

Once a user has entered a proper identification and password, a list of patient names for the floor of the hospital to which that particular system 11 is dedicated is displayed on the programmed processor monitor. This information may come from the hospital's Administration Discharge Transfer (ADT) and is pre-programmed into the second programmable processor. The user can choose the patient from the list who gets medication. This can be done either through the keyboard 17 or by touching the proper portions of the monitor if a touch screen computer is used. If a patient is not listed, the nurse can manually put the patient into the system 11 if authorized by the proper person in charge of registration. After the user chooses the patient's name, the second programmable processor verifies that the user wants to receive information about this patient. The programmed processor lists the medications prescribed for this patient and/or lists the different types of medications loaded into the system 11.

The second programmable processor will preferably include the patient's history of any drug reactions or drug interactions. For example, if a patient is allergic to codeine, the system 11 will not allow codeine to be dispensed to the user for this patient. Also, if a drug interaction (i.e., two or more drugs together give the patient an allergic reaction), the system 11 will not dispense these drugs together to the patient. If either a drug reaction or drug interaction is programmed into the system 11 for a particular patient, a signal or message will appear on the monitor alerting the user about the patient's allergic reaction or interaction.

The user then chooses the medications from the list for the particular patient. For example, a variety of medications may be dispensed such as a syringe of codeine, two vials, two tylenol, and an IV bag. The second programmable processor then verifies that the user is done requesting medications, dispenses the medication into a drawer(s), and the proper drawer(s) opens with the proper amount of medication. The user can retrieve the medication and give it to the patient.

The drawers are operably connected to the second programmable processor and a signal from the second programmable processor will open the drawers when the medication is to be dispensed. These drawers are preferably locked with a spring loaded latch mechanism so that the drawers are normally in a locked position and open when the spring loaded latch is activated by the second programmable processor. The system 11 keeps track of all of the medications dispensed and to whom the medications were dispensed. The system 11 automatically enters this information on the patient's bill as well as prints out a report to be put with the patient's medical chart. The first programmable processor 60 can be used to transfer information to and from the second programmable processor and the second programmed processor also automatically updates the inventory that is loaded in the system 11 at any given time. The system keeps a record of the user, the medication dispensed, the time of request for dispensing the medications, etc. Thus there will always be a record of all transactions involving the system 11. This will eliminate much of the potential human error as well as dispensing medications to patients more accurately and efficiently.

The system 11 is also capable of reverse-dispensing one or a plurality of single dose medications and/or supplies of heterogeneous sizes and types of medication containers in response to input information from the user. This may be necessary when a user does not take the medication that has been dispensed for that patient, for example, if the patient refuses to take the medication or the patient is sleeping, etc. If this happens, the user must then input information into the second programmable processor regarding what is being returned to the system 11 and related information. When this information is entered into the system 11, a return drawer will open and the user will insert the unused medication into the return drawer and close the drawer. The system 11 will credit the patient's account for this unused medication and will keep track of the inventory in the return drawer. The system 11 will print out a record of the unused medication to be included in the patient's record/chart. This also allows for the safe disposal of unused medication and the unused medication can be used at a later time when a pharmacist empties the return drawer and returns the unused medication containers back into inventory or into the dispensing modules 23. If the unused medication or supplies are not the type that are strictly controlled, such as Pepto Bismal TM, IV bags, gauze, etc., the appropriate drawer that holds these medications and/or supplies will open for the user to return the unused items to the proper drawers to be used at a later time.

In a preferred embodiment, a medication dispensing and storage system 11 comprises a cabinet 12 having a plurality of drawers and compartments 14, including a dispensing drawer 13 for medication that is dispensed by at least one medication dispensing module 23 located in the cabinet 12. The system 11 preferably includes a plurality of medication dispensing modules 23, wherein said modules include a housing 25 having a top 27, bottom 29, front, back, and two sides, with the top 27 having an opening to allow medication containers to be inserted therein by a pharmacist.

Figure 3:
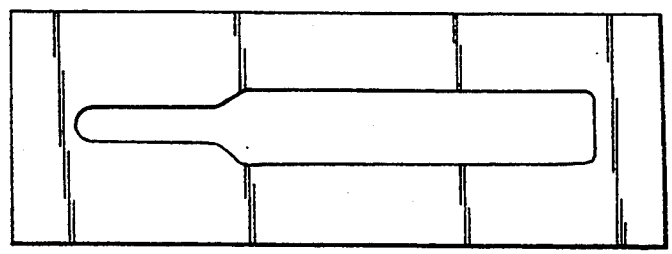
FIG. 3 is a plan view of an example of a template that can be used as a top of the housing of a medication dispensing module used in the present invention.
Figure 4A:
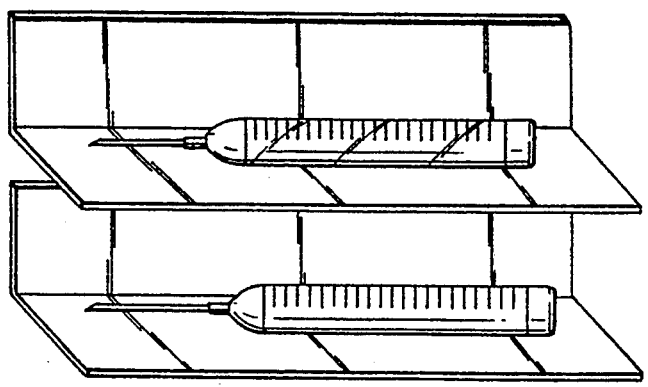
FIGS. 4A, 4B and 4C show a syringe, ampule and vial, respectively, on a shelf in accordance with the present invention.
Figure 4B:
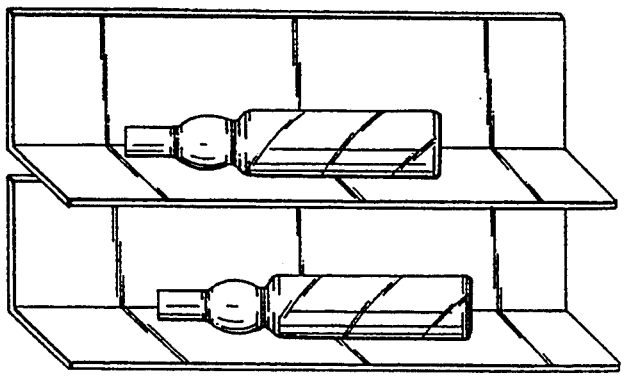
Figure 4C:
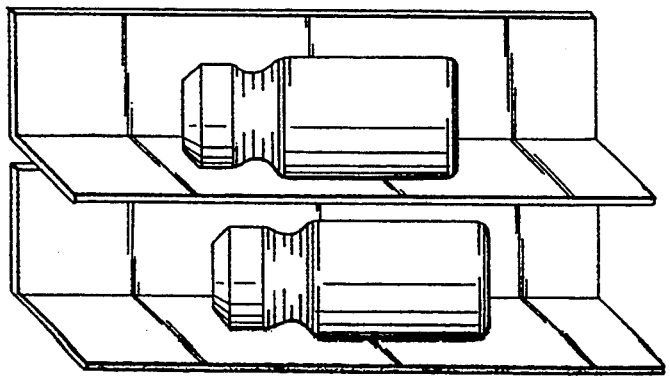
Figure 5:
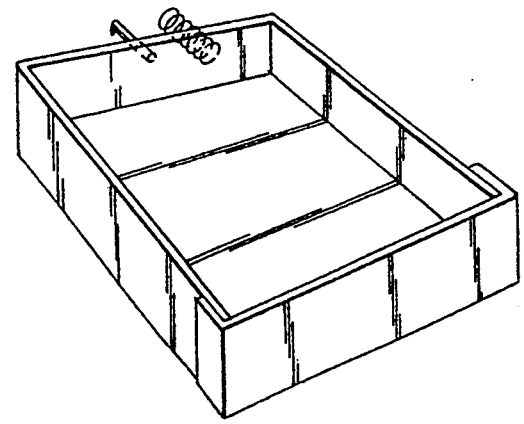
FIG. 5 shows a drawer having a solenoid latch mechanism with a spring in accordance with the present invention.

The top 27 of the housing 25 may include a template such as the one shown in FIG. 3 that is shaped like the outline of the medication container to be inserted into the particular medication dispensing module 23. This enables the pharmacist who is loading the module 23 to know what size and orientation of medication containers are to be loaded into that particular module 23. The bottom 29 of the housing 25 may include a door 66 controlled by a solenoid 86 to open when a medication container in the dispensing module 23 is to be dispensed. The solenoid 86 is activated by a signal from the programmed processor and opens the door 66 at the bottom 29 of the housing 25 and the medication container drops through the door 66 and into the dispensing drawer 13.

The dispensing module 23 also includes a first shaft 31 with each end rotatably secured within the housing 25 near the top of the housing 25, such that the first shaft 31 can easily rotate along its axes. The dispensing module 23 also includes a second shaft 32 with each end rotatably secured within the housing 25 near the bottom 29 of the housing 25, such that it can easily be rotated along its axes. The module 23 further includes a plurality of shelves 33 arranged along a conveyor-type continuous loop, the loop passing over such first and second shafts 31 and 32. The plurality of shelves 33 are connected together to form a loop and move when the second shaft 32 is driven by a motor 35, such as a stepper motor. The motor 35 is operably connected to the second shaft 32 to rotate the second shaft 32 along its axis. This rotation of the second shaft 32 causes the plurality of shelves 33 to pass over the first and second shafts 31 and 32 and move the shelves inside the housing 25.

The medication dispensing module includes a dedicated first programmable processor 60 connected to the motor 35 that starts and stops the motor 35 via electronic signals through electrical wiring and connections known in the art. The programmable processor that is also operably connected to a latch mechanism 64 for each of the drawers. The latch mechanism 64 opens the respective drawers when medication is dispensed to allow a user to retrieve the appropriate medication for a patient.

In a preferred embodiment, the dispensing module 23 further comprises at least one sensor 40 to detect when a medication container is inserted into the dispensing module 23. The sensor 40 can be any sensor as known in the art for detecting whether an item is near the sensor 40 or not, such as a light source for producing a light beam and a photodiode responsive to the light beam. The sensor 40 may include infrared technology to sense when a medication container is inserted in the dispensing module 23. Other types of sensors known in the art can be used as well.

The dispensing module 23 may also include another sensor to detect when a medication container is dispensed by the dispensing module 23. This sensor 42 is located near the bottom of the dispensing module 23 to detect when a medication container is dispensed from the dispensing module 23 into the dispensing drawer 13. This sensor 42 may be an infrared type sensor or any other sensor known in the art. The dispensing module 23 may also include another sensor 44 to detect when a shelf of the dispensing module 23 has a medication container thereon. This sensor 44 is preferably located near the top of the dispensing module 23 so that the plurality of shelves 33 will stop when the shelf is empty so that the pharmacist can load the shelf 33 with a medication container. If the shelf 33 already has a medication container thereon, the shelf 33 will continue to go around until an empty shelf 33 is positioned at the top of the dispensing module 23 so that the pharmacist loading the dispensing module 23 can insert a medication container onto the empty shelf 33. Again, all these sensors can be infrared or other types of sensors known in the art. All of these sensors are electrically connected to the programmed processor which records the information detected by the sensors. This information can be used to automatically inventory the medication containers in the system 11 as well as to properly bill the patient for medication dispensed to the patient.

The medication dispensing modules 23 are of various sizes to be capable of dispensing the plurality of unit drug doses in medication containers of heterogeneous sizes, shapes, and types. The cabinet 12 of the system 11 is designed to hold a number of dispensing modules 23 that are of different sizes and capable of dispensing a large variety of different medications in unit drug doses. The medication containers that can be dispensed by the system 11 includes syringes, ampules, vials, pills, capsules, and other medications and/or supplies.

The first and second shafts 31 and 32 of the dispensing module 23 may have a plurality of flat sides which engage the conveyor-type loop of shelves 33 to advance the shelves 33. In a preferred embodiment, the first and second shafts 31 and 32 are hexagonally shaped. The conveyor-type continuous loop of a plurality of shelves 33 may be formed by connecting the shelves 33 with string, plastic cord, wire, or other connecting material. The string, plastic cord, wire or other connecting material may be a continuous loop threaded through the plurality of shelves 33 or it may be single pieces between each of the plurality of shelves 33. The shelves 33 may be made of plastic, metal or other rigid material. The housing 25 of the dispensing module 23 is preferably made of plexiglass, which enables a pharmacist to do a visual inspection of the modules as well as to visually do an inventory of the medication containers in the dispensing modules 23.

The cabinet 12 may be portable/movable with wheels, rollers or other rolling means 62 connected to the bottom of the cabinet 12 so that the user can easily move the system 11 to different areas of the hospital. The cabinet 12 also includes at least one drawer that is used for returning unused medication. This drawer is opened by the second programmable processor when the user has indicated that medication is to be returned and gives the type and amount of the medication. This return drawer may be designed such that only items can be inserted therein and items contained within the drawer cannot be removed, except by pharmacist or other authorized personnel. The cabinet 12 also contains other drawers or compartments to store equipment that is not in the medication dispensing modules 23, such as IV bags, gauze, bandages, etc.

The above-described preferred embodiment of the present invention should not be construed as limiting the scope of the following claims. The invention has been described in detail to provide a thorough description of the capabilities and options of the method of the invention. One skilled in the art could readily add to or subtract from various options described herein without departing from the spirit and scope of the invention.

What is claimed is:

1. A medication dispensing and storing module, to be used in a medication administration system to store and dispense unit doses of medication in a highly controlled manner without allowing a user of the module to dispense more medication than requested without having the inventory automatically updated, said module comprising:
   a housing having a top, bottom, front, back, and two sides, said top having an opening to allow medication containers to be inserted therein and said bottom having an opening to allow medication containers to be dispensed therefrom;
   a first shaft having first and second ends with each of said ends of said first shaft rotatably secured within said housing;
   a second shaft having first and second ends with each of said ends of said second shaft rotatably secured within said housing;
   a plurality of shelves arranged along a conveyor-type continuous loop, said loop passing over said first and second shafts;
   a motor operably connected to one of said shafts to rotate one of said shafts along its axis, the rotation of said shaft causing the plurality of shelves to move along said loop; and
   a first programmable processor connected to said motor of said module to enable said module to be loaded in a controlled manner, and to enable said module to dispense unit doses of medication in a controlled manner for a particular patient, said first programmable processor being capable of receiving and storing information about the respective type, quantity and medication information of each of the unit doses of medication loaded onto an assigned shelf of said module, the information in said first programmable processor being automatically updated when a unit dose of medication is dispensed from said module and said first programmable processor containing information about the remaining inventory in said module at any given time.

2. The module of claim 1 further comprising at least one sensor to detect when a medication container is inserted therein.

3. The module of claim 1 further comprising at least one sensor to detect when a medication container is dispensed therefrom.

4. The module of claim 1 further comprising at least one sensor to detect when a shelf of said dispensing module has a medication container thereon.

5. The module of claim 1 further comprising first sensors to detect when a medication container is inserted therein, second sensors to detect when a medication container is dispensed therefrom, and third sensors to detect when a shelf of said dispensing module has a medication container thereon, and all of said sensors being connected to said first programmable processor to record the information detected by said first, second and third sensors.

6. The module of claim 1 wherein said shelves enable said medication dispensing module to store and dispense a plurality of unit drug doses in medication containers of heterogeneous sizes, shapes and types.

7. The module of claim 1 wherein the medication containers stored and dispensed include one of the group consisting of syringes containing a dose of medicine, ampules containing a dose of medicine, and vials containing a dose of medicine.

8. The module of claim 1 wherein the top of said housing defines a template with an opening shaped like the medication container to be inserted therein.

9. The module of claim 1 wherein the bottom of said housing includes a door actuated by a solenoid to open the door to dispense a medication container, said solenoid being connected to said first programmable processor.

10. The system of claim 1 wherein said housing is made of plexiglass to enable an individual to perform a visual inspection of said module and to perform a visual inventory of the medication containers in said module.

11. A medication dispensing and storing system comprising:
   a cabinet having a plurality of drawers and compartments;
   at least one medication dispensing module located in at least one of the compartments or drawers, said dispensing module being modular and removable from said system, said medication dispensing module comprising:
      a housing having a top, bottom, from, back, and two sides, said top having an opening to allow medication containers to be inserted therein and said bottom having an opening to allow medication containers to be dispensed therefrom;

a first shaft having first and second ends with each of said ends of said first shaft rotatably secured within said housing;

a second shaft having first and second ends with each of said ends of said second shaft rotatably secured within said housing;

a plurality of shelves arranged along a conveyor-type continuous loop, said loop passing over said first and second shafts;

a motor operably connected to one of said shafts to rotate one of said shafts along its axis, the rotation of said shaft causing the plurality of shelves to move along said loop; and a first programmable processor connected to said motor of said module to enable said module to be loaded in a controlled manner, and to enable said module to dispense unit doses of medication in a controlled manner for a particular patient, said first programmable processor being capable of receiving and storing information about the respective type, quantity and medication information of each of the unit doses of medication loaded onto an assigned shelf of said module, the information in said first programmable processor being automatically updated when a unit dose of medication is dispensed from said module, and said first programmable processor containing information about the remaining inventory in said module at any given time; and a second programmable processor in said cabinet, said second programmable processor being operatively connected to said first programmable processor and to at least one of said drawers or compartments.

12. The system of claim 11 further comprising a keyboard, touch screen or other input device connectable to said second programmable processor to enable a user to input information.

13. The system of claim 11 further comprising a latch mechanism for each of said drawers, wherein said latch mechanism includes a spring, said latch mechanism locks the drawers when the drawers are closed and opens the proper drawers by use of the spring when signalled by said second programmable processor to dispense medication.

14. The system of claim 11 wherein said cabinet is portable with rolling means connected to the bottom of said cabinet.

15. The medication dispensing module of claim 11 wherein said medication dispensing module further comprises first sensors to detect when a medication container is inserted therein, second sensors to detect when a medication container is dispensed therefrom, and third sensors to detect when a shelf of said dispensing module has a medication container thereon, and all of said sensors being connected to said first programmable processor to record the information detected by said first, second and third sensors.

16. The medication dispensing module of claim 11 wherein the bottom of said housing includes a door actuated by a solenoid to open the door to dispense a medication container, said solenoid being connected to said first programmable processor.

17. The system of claim 11 wherein said medication dispensing module further comprises at least one sensor to detect when a medication container is inserted into said module.

18. The system of claim 11 wherein said medication dispensing module further comprises at least one sensor to detect when a medication container is dispensed from said module.

19. The system of claim 11 wherein said second programmable processor is capable of receiving input of user information, patient information and medication information, said second programmable processor being operatively connected to said first programmable processor to enable the first and second programmable processors to transfer information to and from each other regarding the respective type, quantity and medication information of each of the unit doses of medication loaded into said module and dispensed from said module.

20. The system of claim 19 wherein said second programmable processor uses information from the first programmable processor of each of said dispensing modules regarding the respective type, quantity and medication information of each of the unit doses of medication loaded into said modules and dispensed from said modules to determine the remaining inventory in said modules and, thus, said system at any given time.

21. A medication dispensing and storing system comprising:

a cabinet having a plurality of drawers and compartments;

at least one medication dispensing module located in at least one of the compartments, said dispensing module including:

a programmable processor connected to said module to dispense medication for a particular patient into at least one of said drawers;

a housing having a top, bottom, from, back, and two sides, said top having an opening to allow medication containers to be inserted therein, said bottom including a door actuated by a solenoid to open the door to dispense a medication container, said solenoid being connected to said programmable processor;

a first shaft having first and second ends with each of said ends of said first shaft rotatably secured within said housing;

a second shaft having first and second ends with each of said ends of said second shaft rotatably secured within said housing;

a plurality of shelves arranged along a conveyor-type continuous loop, said loop passing over said first and second shafts; and a motor operably connected to one of said shafts to rotate one of said shafts along its axis, the rotation of said shaft causing the plurality of shelves to move along said loop.

22. A medication dispensing module comprising:

a programmable processor connected to said module to dispense medication for a particular patient;

a housing having a top, bottom, front, back, and two sides, said top having an opening to allow medication containers to be inserted therein, said bottom including a door actuated by a solenoid to open the door to dispense a medication container, said solenoid being connected to said programmable processor;

a first shaft having first and second ends with each of said ends of said first shaft rotatably secured within said housing;

a second shaft having first and second ends with each of said ends of said second shaft rotatably secured within said housing;

a plurality of shelves arranged along a conveyor-type continuous loop, said loop passing over said first and second shafts; and a motor operably connected to one of said shafts to rotate one of said shafts along its axis, the rotation of said shaft causing the plurality of shelves to move along said loop.

* * * * *